Patented Jan. 5, 1943

2,307,253

UNITED STATES PATENT OFFICE 2,307,253

PROCESS FOR THE PRODUCTION OF NON-CAKING FERTILIZER MATERIALS

Jew Y. Yee and Royall O. E. Davis, Washington, D. C., assignors to Claude R. Wickard, as Secretary of Agriculture of the United States of America, and to his successors in office No Drawing. Application October 22, 1940, Serial No. 362,228

5 Claims. (Cl. 23—102)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to the treatment of fertilizer materials in order to change their surface characteristics and to render them resistant to caking during shipment or storage; and to the products thus obtained.

It has long been known that many salts or compounds in powder, crystalline or granular form have a tendency to cake and to form more or less solid masses under alternations of humidity and/or temperature, requiring subsequent breaking up of the mass before its use for various purposes. For instance, the caking tendency of fertilizer materials leads to the expenditure of much labor and time in rendering it suitable for even distribution in the field and to prevent clogging of distribution machinery. Materials easily soluble in water or highly hygroscopic are particularly susceptible to these difficulties.

Various devices have been employed previously to obviate the difficulties encountered due to this caking tendency. As illustrative of these; granulation by agitation at elevated temperature with small amout of water present, mixing with inert mineral material, such as ground phosphate rock or limestone, or with bulky organic material such as seed meals, cocoa shell meal or ground peat; spraying molten materials to form pellets of uniform size, thus reducing the points of contact between particles, shipping in moisture proof bags or other containers, and growing large crystals, screened to uniform size.

We have discovered that when certain chemical compounds, hereinafter more specifically described, are treated with ammonia, as also hereinafter specifically described, the following results are obtained: (1) ammonia reacts with the surface of the particles to form an enveloping film of solution, the points and sharp edges going into solution first, resulting in rounded particles, (2) removal of ammonia at this stage results in a deposit of more or less uniform thickness over the surface of each particle, consisting of very finely divided particles adhering firmly to the original particle, (3) by continuous agitation while subjecting the material to gaseous ammonia in the presence of finely divided inert material, a product is obtained on removal of ammonia, the particles of which are covered with a coating of the inert material firmly attached to the surface, (4) by the presence of a few percent of mineral or vegetable oil the product is rendered resistant to absorption of moisture, and (5) the products obtained by the treatment with ammonia are rendered resistant to caking under storage conditions of alternating high and low humidity and temperature.

Typical of the materials that can be rendered caking resistant by our process are crystalline nitrogen compounds that are soluble in liquid ammonia alone or in ammonia water, such as ammonium nitrate, sodium nitrate, calcium nitrate, urea, etc., but it is to be understood that we are not limited to those here mentioned, for there are a number of other compounds or mixtures of compounds that are susceptible to treatment by our process and all such are included.

Urea forms a number of double compounds by addition to an acid, a base or a salt, and all such compounds when readily soluble in ammonia or water are included. In addition, compounds such as ammonium sulphate, only slightly soluble in ammonia but readily soluble in water may be treated by our process and rendered caking resistant; also compounds not classified as fertilizer materials, such as sodium chloride, sodium bromide, etc., may be rendered caking resistant by our process. Often associated with the fertilizer compounds mentioned are a number of other compounds or minor constituents such as potassium chloride, potassium nitrate, magnesium chloride, magnesium sulphate, etc., which do not interfere with the operation of our process as described hereafter.

One of the objects of this invention is to obtain in a caking-resistant form, fertilizer and other highly soluble and hygroscopic compounds by treatment with ammonia to change the surface configuration of the particles. In storage, such compounds cake into compact masses due in part to the shape of the crystals and in part to the cementation of the particles. The many points of contact between particles act as nuclei for condensation of water from the air to form a film of solution and on subsequent evaporation of the moisture under less humid conditions, the compound in solution is deposited to form a bridge between the particles, thus cementing them together. After treatment with ammonia, as described in this invention, the crystals or paricles of material have their surfaces changed so that the number of points of contact between particles are greatly reduced, thus imparting to them much greater resistance to caking.

Another object of this invention is to convert crystalline fertilizer and other materials that are highly hygroscopic into products possessing reduced rate of water absorption by the method hereinafter described of treatment with ammonia and a surface coating of inert solid or fibrous materials containing a small amount of oil. The coating materials attached to the surface of the particles, while the latter are covered with a solution film during the ammonia treatment, will become distributed over the surfaces of the particles and will adhere tenaciously thereto when the liquid phase is removed. The tendency of these coated particles to absorb moisture from the atmosphere is thereby reduced.

A third object of this invention is to produce a highly concentrated nitrogen compound, possessing reduced caking tendency and reduced rate of water absorption when in storage, from naturally caking original materials of the same major composition. This method is in contrast to mixing inert materials in sufficient quantity to prevent caking, as in the latter case, considerable dilution of the major constituent results. The loosely attaching coating materials are easily shaken off the surface and become segregated or cause dustiness in handling, while with the method of this invention all of these undesirable conditions are avoided by the creation of an effective surface-protective coating on the product.

In carrying this invention into operation we have found that the appliction of ammonia to the compounds to be treated may be effected in various ways and under various conditions; the ammonia may be in the form of a gas, either anhydrous or hydrous, or mixed with inert gas or gases, such as air; the pressure and time of treatment may be varied depending upon the partial pressure of ammonia in th gas mixture, the total pressure applied, and the material being treated; the temperature may vary over a range of temperatures up to the melting point of the material being treated; all resulting in products covered by this invention.

The conditions imposed during the operation of the process determine the character of the product obtained, and by varying the conditions simultaneously or independently a product with desired characteristics may be obtained. As an example, in treating urea with ammonia at 80 lbs. pressure for 20 minutes, or at 100 lbs. pressure for 10 minutes, and then removing the ammonia, a product is obtained with substantially the same characteristics as by treating the urea for 20 minutes with a mixture of air and ammonia at a total pressure of 100 lbs. per square inch, of which 80 lbs. is the partial pressure of ammonia and 20 lbs. the partial pressure of air. The higher the concentration of ammonia or the partial pressure of ammonia in the mixed gas, the shorter will be the necessary time of treatment. In addition, the pressures employed and time of treatment necessary are dependent upon the compounds being treated, in order to obtain corresponding products.

There are certain preferred procedures, a few typical ones of these will now be described as specific embodiments of this invention, it being understood, however, that we are not limited to the details herein about to be described, but may establish any other set of operating conditions that yield the desired products.

In general, the process consists of treating fertilizer materials such as urea, calcium nitrate, etc., possessing hygroscopic properties under humid conditions, or exhibiting caking tendency in storage, with gaseous ammonia. This may be done by bringing the ammonia into contact with the material in a closed cylindrical vessel, rotating the cylinder in an essentially horizontal position, or by employing a stationary cylinder supplied with an interior agitator, for the slow agitation of the material while being subjected to the ammonia treatment. The temperature of treatment may be essentially that of ordinary atmosphere temperature or over a range of temperatures up to the melting point of the material being treated. The pressure is varied depending on the material being treated, for example, with urea the pressure may vary from 20 to 120 lbs. per square inch. The time of treatment required is short, varying from one to 30 minutes, depending on the material being treated and the vapor pressure of ammonia. An inert powdered material, such as peat, oiled peat, dolomite, magnesia or other inert materials or a mixture of inert materials, may be introduced in small amounts along with the fertilizer materials and the mixture treated with ammonia or ammonia containing gas; or the fertilizer material may be first treated with ammonia, the ammonia released, the inert material added, and the mixture then re-treated with ammonia. In any event the product obtained is made up of particles or granules with rounded edges, each particle surrounded by a firmly attached coating of inert material and the mass with reduced tendency to absorb water and resistant to caking in storage. After the desired action of ammonia is obtained, the pressure is released, and the ammonia recovered by any convenient means.

A preferred procedure is charging a naturally caking material and a small percent of powdered and oiled peat into a cylinder, closing and rotating the cylinder, bring gaseous ammonia into contact with the mixture at a pressure of 5 to 120 lbs. per square inch, maintaining the pressure for a period from 1 to 30 minutes, removing the ammonia and discharging the product from the cylinder. The treatment may be carried out as a batch process, or by proper arrangement, as a continuous process, employing the ammonia counter current to the flow of material.

We illustrate our process with the following examples:

*Example 1.*—100 grams of crystalline urea were tumbled in a small closed rotary steel cylinder at about 25 revolutions per minute and treated with ammonia gas at 100 pounds gage pressure for 10 minutes at ordinary temperature. At the end of this time, the ammonia pressure was released, the product removed and the residual ammonia driven off by heating the product to 50°—60° C. The product obtained was free flowing, absorbed water essentially at the same rate as untreated urea but on drying again gave a mass easily crumbled under slight pressure.

*Example 2.*—97 parts of the product obtained in Example 1 were mixed with 3 parts of peat dust containing 21% moisture and the mixture treated with ammonia gas at 100 lbs. gage pressure in a closed rotating drum at about 25 R. P. M., for 2 minutes. At the end of this period, the ammonia pressure was released, the product removed and residual ammonia driven off by heating the product to about 60° C. The product obtained in this experiment was granular, free flowing, and when subjected to high humidity for the absorption of moisture and then allowed to dry out again, does not cake, but retains its granular, free flowing properties, due to the protective coating of peat on the surface of the particles, and firmly imbedded there by the action of ammonia on the surface of the particles of urea.

*Example 3.*—80 parts of crystalline urea, 15 parts of finely ground dolomite and 5 parts of ground peat containing 27% moisture, were well mixed in a rotating cylinder at 30 R. P. M., and treated for 5 minutes with a gaseous mixture consisting of 6 parts of ammonia and 1 part of air at 90 lbs. per square inch gauge pressure. At the end of this period the gas pressure was released and the product heated to about 60° C. to drive off residual ammonia. The product obtained was granular and free flowing, and was resistant to caking when subjected to alternating high and low humidity conditions. The granules had a well adhering coating over their surfaces, of dolomite and peat dust.

*Example 4.*—3 parts of vegetable oil were added by spraying to 97 parts of the warm product of Example 3 while being agitated. The product was resistant to moisture absorption, and showed little tendency to cake when subjected to alternating high and low humidity and temperature.

*Example 5.*—95 grams of ammonium nitrate crystals (14–48 mesh) and 5 grams of peat dust containing 21% moisture were well mixed and subjected to treatment with gaseous ammonia at 15 lbs. gage pressure for 10 minutes while being agitated in a closed cylinder at ordinary temperature. At the close of this period the pressure was released and the product heated to 60°—80° C. to drive off residual ammonia. The product was granular and free flowing and the surface of the particles were partially covered with a firmly adhering coating of peat dust. This product absorbed moisture at a rate not greatly different from that of crystalline ammonium nitrate, but it was strongly resistant to caking when in storage.

*Example 6.*—95 grams of ammonium sulphate, finely crystalline, and 5 grams of peat dust containing 30% moisture were well mixed and the mixture treated with gaseous ammonia at 125—130 pounds gage pressure for 10 minutes, at room temperature in a closed cylinder with agitation. Pressure was released and heat applied at 80° C. to drive off ammonia. The product was granular and free flowing and showed high resistance to caking when subjected to alternating high and low humidity conditions.

*Example 7.*—97 grams of potassium chloride, 4—48 mesh, and 3 grams of powdered peat containing about 30% moisture were well mixed and the mixture treated with ammonia gas at 130–135 pounds gage pressure for 10 minutes in an inclosed steel cylinder while being agitated. After releasing the ammonia pressure, the product was heated moderately to remove the last traces of ammonia. The product was an easy flowing granular material and was found to be highly resistant to caking under conditions of alternating high and low humidity conditions.

*Example 8.*—60 grams of crystalline calcium nitrate tetrahydrate and 3 grams of powdered peat were well mixed and the mixture treated with a 20% ammonia-air mixture for 15 minutes at atmospheric pressure in a cylinder while being subjected to agitation. Ammonia was then removed from the product by subjecting it to a current of warm air (below 42° C.). The product thus obtained was free-flowing and granular, and was strongly resistant to caking when in storage. The crystals or granules were coated with strongly adhering particles of peat which imparted the caking resistance property to the calcium nitrate.

Although this invention is of particular value in the preparation of caking resistant urea, it is not limited to the treatment of the specific materials cited, but may be generally applied to the treatment of any compound that is soluble in liquid ammonia or water. For example, we have found that by following the same treatments, except using different concentrations of ammonia as herein described, we are able to obtain products showing greatly reduced tendency to cake on long standing. We have further found that in the preparation of mixed fertilizer we can treat the ammonia and water soluble components of the mixed fertilizer with ammonia gas as herein described, using the insoluble components as the coating materials.

The ammonia concentration or partial pressure used in the process of this invention should be high enough for the reaction to take place between the ammonia and the compound to be treated to form a layer of solution (or complex compounds in the solution as the cases may be) on the surface of the particles or crystals of the compound being treated, but the ammonia pressure should not be so high, or the time of treatment so long, as to cause the compound to go into solution completely. In general, the ammonia pressure can be varied between wide limits, not only with different compounds being treated, but for the same compound, it can be changed according to the time of treatment. With different compounds, the ammonia pressure used can be varied to a still greater extent, according to the rate of reaction between the compound being treated and the ammonia. For example, urea can be treated with substantially pure ammonia gas at 7 atmospheres pressure with agitation for a short time without showing any sign of sticking after the ammonia pressure is released, while calcium nitrate will change to a liquid in a very short time in presence of only one atmosphere of ammonia.

The ammonia pressure used in this process is also varied according to the moisture content in the compound being treated as well as that in the coating materials, especially that in the fibrous coating materials like peat dust. The moisture present in either the compound or coating materials takes part in the formation of the layer of solution on the surfaces of the particles as herein described.

The amount of coating materials needed to reduce the caking tendency of chemical compounds depends on the nature of the compound being treated as well as the amount of anti-caking characteristics desired. We have found that as little as 1% of finely divided coating material produces a marked reduction in the caking tendency of certain compounds, or if desired, as much as 45%, or even more of coating material may be added.

It is to be understood that the property of resisting caking imparted to materials subjected to the described treatment, under certain conditions as involved in the process described, the subject of this invention, is in no sense a simple mixture of crystalline material with a small amount of finely divided inert material which may or may not adhere firmly to the surfaces of the crystals. In contrast, by treating a material which is soluble in liquid ammonia with either pure gaseous ammonia or a mixture of ammonia and an inert gas, such as air, under ammonia pressure exceeding the ammonia vapor pressure of a saturated solution of the material in liquid ammonia, there will be a condensation of the gaseous ammonia to liquid on the surface of the particles, thereby producing an enveloping film of saturated solution over the surface. Since condensation will occur first at the points and sharp edges, these areas will be dissolved first and spread over the surface of the particles. If the ammonia is then allowed to evaporate, the particles remaining will not have been altered in composition, but the sharp points and edges will have been rounded off, tending to produce rounded particles, which are well known to be more resistant to caking than particles with angular and irregular surfaces.

By mixing with the soluble material a firmly divided insoluble inert material simultaneously with the formation of the film of solution over the surface of the soluble particles, the fine insoluble, inert particles will adhere to the surfaces of the soluble particles. When ammonia is allowed to evaporate, these inert particles will remain firmly attached to the surfaces as an integral part due to the deposition of the material in solution as a bonding material when the ammonia evaporates.

Not only are materials soluble in liquid ammonia susceptible to this treatment, but materials soluble in water may be treated in the same way if a small amount of moisture is present. As an example, ammonium sulphate is mixed with powdered peat containing 30% moisture and subjected to ammonia treatment. The high attraction between water and ammonia causes the formation of a solution of ammonia in water in which ammonium sulphate is soluble. A saturated solution of ammonium sulphate forms on the surface of the ammonium sulfate crystals resulting in the same action described above. The small amount of moisture present is evaporated along with the evaporation of ammonia, leaving a dry, coated material of ammonium sulphate in the same manner that a coated material soluble in liquid ammonia is produced. Since all materials showing a tendency to cake under changing conditions of humidity are soluble in water, the method is applicable to all such. Moreover, for substances soluble in liquid ammonia and also in water, it is not necessary to employ anhydrous ammonia gas, or coating materials free from moisture.

While the method described is applicable to materials such as urea, sodium nitrate, and ammonium sulphate, used in fertilizers, it is equally applicable to mixtures of fertilizers containing ammonia soluble or water soluble materials, and/or insoluble materials.

It is not implied that this method be applicable to fertilizers or fertilizer materials only, but is applicable also to the treatment of other ammonia or water soluble materials showing a tendency to cake such as sodium chloride and sugar. In the case of substances used as foods, such as sugar, the insoluble, inert material should be tasteless and harmless, such as calcium carbonate or magnesia.

The method described has pertained to certain specified materials, but the descriptions are to be considered as illustrative only, and not restrictive as to materials or limiting details of procedure. With suitable variations as to pressure, concentration of ammonia, time of treatment and temperature, other materials soluble in liquid ammonia or water may be treated in essentially the same manner with a product resulting of substantially the same essential character in regard to its resistance to caking. In addition, while inert material and fibrous material, such as dolomite, calcium carbonate and peat have been mentioned as suitable for use as coating materials, it is not intended to restrict our invention to the use of these, as other inert materials, such as finely divided magnesia, silicious compounds, carbon, limestone, etc., and fibrous materials, such as cocoa shell meal, cottonseed meal, etc., exhibiting the same properties may be employed and it is intended that all such and mixtures of these materials shall be included in this invention.

Having thus described our invention, what we claim for Letters Patent is:

1. The method of reducing the tendency of granular, ammonia-soluble material to cake on standing, comprising agitating the granular material in the presence of ammonia gas, with added finely pulverized material which does not dissolve in ammonia and which does not tend to cake on standing, to form an adherent coating of the added material firmly attached to the granules.

2. The method of reducing the tendency of granular, ammonia-soluble material to cake on standing, comprising agitating the granular material in the presence of ammonia gas, with added finely pulverized material which does not dissolve in ammonia and which does not tend to cake on standing, at about room temperature to form an adherent coating of the added material firmly attached to the granules.

3. The method of reducing the tendency of ammonium nitrate granules to cake on standing, comprising agitating them in the presence of ammonia gas with peat dust, to form an adherent coating of the peat dust firmly attached to the nitrate granules.

4. The method of reducing the tendency of sodium nitrate granules to cake on standing, comprising agitating them in the presence of ammonia gas with peat dust, to form an adherent coating of the peat dust firmly attached to the nitrate granules.

5. The method of reducing the tendency of urea granules to cake on standing, comprising agitating them in the presence of ammonia gas with peat dust, to form an adherent coating of the peat dust firmly attached to the urea granules.

JEW Y. YEE.
ROYALL O. E. DAVIS.